United States Patent [19]

Onstott et al.

[11] Patent Number: 4,896,942

[45] Date of Patent: Jan. 30, 1990

[54] POLARIZATION-MAINTAINING OPTICAL FIBER

[75] Inventors: James R. Onstott; Michael J. Messerly; Raymond C. Mikkelson; Lawrence J. Donalds, all of St. Paul, Minn.

[73] Assignee: Minnesota Mining and Manufacturing Company, Saint Paul, Minn.

[21] Appl. No.: 306,822

[22] Filed: Feb. 3, 1989

[51] Int. Cl.$^4$ .............................................. G02B 6/22
[52] U.S. Cl. ................................................. 350/96.33
[58] Field of Search ............... 350/96.29, 96.30, 96.31, 350/96.33

[56] References Cited

U.S. PATENT DOCUMENTS

| | | | |
|---|---|---|---|
| 4,415,230 | 11/1983 | Keck | 350/96.33 |
| 4,426,129 | 1/1984 | Matsumura et al. | 350/96.33 |
| 4,493,530 | 1/1985 | Kajioka et al. | 350/96.33 |
| 4,494,969 | 1/1985 | Bhagavatula | 350/96.33 |
| 4,500,168 | 2/1985 | Kajioka et al. | 350/96.33 |
| 4,549,781 | 10/1985 | Bhagavatula et al. | 350/96.33 |
| 4,610,506 | 9/1986 | Tokunaga et al. | 350/96.33 |
| 4,818,047 | 4/1989 | Takuma et al. | 350/96.33 |

FOREIGN PATENT DOCUMENTS

| | | | |
|---|---|---|---|
| 0109604 | 5/1984 | European Pat. Off. | 350/96.33 |
| 58-215606 | 6/1982 | Japan | 350/96.33 |
| 58-211704 | 12/1983 | Japan | 350/96.33 |
| 59-15905 | 1/1984 | Japan | 350/96.33 |
| 2104241 | 3/1983 | United Kingdom | 350/96.33 |

OTHER PUBLICATIONS

Eickhoff; "Stress-Induced Single-Polarization Single-Mode Fiber"; *Optics Letters;* vol. 7, No. 12; Dec. 1982; pp. 629–631.

*Primary Examiner*—William L. Sikes
*Assistant Examiner*—Robert E. Wise
*Attorney, Agent, or Firm*—Donald M. Sell; Walter N. Kirn; Stephen W. Buckingham

[57] ABSTRACT

A single-mode, polarization-maintaining optical fiber has both excellent signal attenuation and resistance to adverse bending effects because (1) its cladding and any portion of the jacket that is within five times the radius of the mode-field in its core have a substantially uniform index of refraction that is at least 0.005 less than that of pure silica, and (2) the index of refraction of the core is at least as great as, but preferably not substantially greater than, that of pure silica. Preferably, the stress-applying region of the fiber is elliptical, and the jacket is pure silica.

17 Claims, 2 Drawing Sheets

POLARIZATION-MAINTAINING OPTICAL FIBER

BACKGROUND OF THE INVENTION

1. Field of the Invention

The invention concerns an improved single-mode, polarization-maintaining optical fiber, especially one that is polarization-maintaining by virtue of an oval or elliptical stress-applying region. The preservation of polarization is especially important in sensor fibers such as are used in fiber gyroscopes and interferometric sensors.

2. Description of the Related Art

A single-mode optical fiber typically has a glass inner core of high index of refraction, a cladding of low index of refraction, and a silica jacket surrounding the cladding. The diameter of the core is from 3 to 10 micrometers, and the diameter of the jacket is 80 micrometers for sensor fibers and 125 micrometers for telecommunications. According to Shibata et al.: "Fabrication of Polarization-Maintaining and Absorption-Reducing Fibers," *Journal of Lightwave Technology*, Vol. LT-1, No. 1, pp. 38–43 (1983) at page 38:

"The general approach to maintaining linear polarization in single-mode fibers is to increase fiber birefringence so as to reduce the power interchange between polarization modes. Several kinds of highly birefringent single-mode fibers have been demonstrated: fibers with a noncircular core, which cause birefringence due to noncircular geometry [citing Ramaswamy et al.: 'Polarization Characteristics of Noncircular Core Single-mode Fibers', *Applied Optics*, Vol. 17, No. 18, pp 3014–3017 (1978)]; fibers with an elliptical cladding, which cause anisotropic strains in the core [citing Ramaswamy et al.: 'Birefringence in Elliptically Clad Borosilicate Single-mode Fibers', *Applied Optics*, Vol. 18, No. 24, pp 4080–4084 (1979) and Katsuyama et al.: 'Low-loss Single Polarization Fibers,' *Electron. Lett.*, Vol. 17, No. 13, pp 437–474 (1981)]; and fibers with refractive-index pits on both sides of the core [citing Hosaka et al.: 'Single-mode Fiber with Asymmetrical Refractive Index Pits on Both Sides of Core,' *Electron. Lett.*, Vol. 17, No. 5, pp 191–193 (1981)]."

The Shibata publication concerns a birefringent single-mode fiber, the silica jacket of which encloses two fan-shaped, diametrically-opposed regions that have been doped to have a different thermal expansion than does the rest of the jacket, resulting in anisotropic stress-induced birefringence in the core. At page 40, the Shibata publication says these fibers "were fabricated with jacketing techniques. A single-mode fiber preform made by the VAD method [citing Tomaru et al.: 'Fabrication of Single-mode Fibers by VAD,' *Electronics Lett.*, Vol. 16, No. 13, pp 511–512 (1980)] was elongated to several millimeters in diameter. Then, it was put into the center of a thick-wall jacketing silica tube with about 15-mm inner diameter. Stress-applying parts were prepared by a depositing $SiO_2$-$B_2O_3$-$GeO_2$ glass layer in a silica tube via the MCVD method. The rods prepared by the MCVD method were also elongated to several millimeters and arranged on both sides of the core rod in the jacketing tube. The remaining inner spaces in the jacketing tube were filled with several commercially available silica rods, for example, four rods with several millimeters of diameter. The final preforms were drawn into fibers by a carbon-resistance furnace."

A birefringent single-mode fiber having similarly-shaped stress-applying regions as well as an elliptical core is shown in U.S. Pat. No. 4,480,897 (Okamoto et al.). FIGS. 6, 8, 11 and 12 of U.S. Pat. No. 4,561,871 (Berkey) also illustrate the manufacture of birefringent single-mode fibers having diametrically-opposed stress-applying regions separated from the core.

Katsuyama et al.: "Low-loss Single Polarization Fibers," *Applied Optics*, Vol. 22, No. 11, pp 1741–1747, 1983, concerns a single-mode, polarization-maintaining optical fiber having three concentric silica regions that make up the cladding. The intermediate region (which the Katsuyama publication calls the "elliptical-jacket" or simply "jacket") is made stress-applying by being doped with $B_2O_3$. This intermediate stress-applying region also is doped with $GeO_2$ in order to make its refractive index the same as that of the pure silica in the inner and outer barrier regions.

A procedure for making a single-mode, polarization-maintaining optical fiber that has an elliptical stress-applying region is disclosed in U.S. Pat. No. 4,274,854 (Pleibel et al.). After grinding a hollow substrate tube of quartz (pure silica) to have two diametrically opposed flat surfaces, a series of siliceous layers are deposited onto the interior surface of the substrate tube, after which the tube is collapsed to provide a preform and then drawn into a fiber. Because the material of the substrate tube cools first, its inner surface is elliptical in cross section and constrains the deposited siliceous layers so that they subject the core to an asymmetric stress, giving rise to birefringence. Although not disclosed in the Pleibel patent, birefringent single-mode optical fibers now on the market that have an elliptical stress-applying region also have an inner barrier of substantially circular cross section between the core and the stress-applying region. As pointed out in the Katsuyama publication, the inner barrier minimizes absorption or light transmission losses. See also Cohen et al.: "Radiating Leaking-Mode Losses in Single-Mode Lightguides with Depressed-Index Claddings", *IEEE J. of Quantum Elec.*, QE-18, p. 1467 (1982).

While the above citations teach methods for making a single-mode fiber birefringent, none of them considers the adverse effects of either macro-bending or micro-bending, both of which are of great importance for applications wherein the fiber is coiled into small packages, e.g., in gyroscopes. It is known that both macro-bending and micro-bending result in signal attenuation and that this result can be minimized by increasing the refractive index difference between the core and cladding to reduce the mode-field diameter. See Isser et al.: "Bending and Microbending Performance of Single-Mode Fibers," Technical Report TR-63, January 1987, from Corning Glass Works which describes tests for such losses on fibers that are not fully identified. This increased refractive index difference has been accomplished by increasing the core germanium oxide concentration, but the resulting improvement in bending performance then comes at the expense of higher transmission losses. See Ainslie et al.: "Interplay of Design Parameters and Fabrication Conditions on the Performance of Monomode Fibers Made by MCVD," *IEEE*, Vol. QE-17, No. 6, pp 854–857 (1981), FIG. 1 of which shows these losses in fibers that are not polarization-maintaining. That these losses apply to polarization-maintaining fibers is shown in Rashliegh et al.: "Polarisation Holding in Coiled High-Birefringence Fibers", *Elec. Ltrs.*, Vol. 19, No. 20, pp. 850–851 (1983).

A problem encountered when the core of an optical fiber is highly doped with germanium oxide is that the single-mode optical fiber may be degraded by exposure to ionizing radiation such as is commonly encountered in satellites as well as in many other locations. See Brambani et al.: "Radiation Effects in Polarization-maintaining Fibers," Paper No. 992-07, SPIE International Symposium on Fiber Optics, Optoelectronics and Laser Applications, Boston, Mass, September, 1988.

SUMMARY OF THE INVENTION

The invention provides a single-mode, polarization-maintaining optical fiber that is believed to have less signal attenuation than does any prior fiber that is equally resistant to adverse effects from macro-bending and micro-bending. The novel single-mode optical fiber can be at least as resistant to adverse effects from ionizing radiation as is any such fiber now on the market.

Like some polarization-maintaining optical fibers of the prior art, that of the invention has
- a core,
- a cladding which includes asymmetric stress-applying region or regions and an inner barrier between the core and the stress-applying region or regions, and
- a jacket surrounding the cladding.

The polarization-maintaining optical fiber of the invention differs from those prior optical fibers in that:
- the cladding and any portion of the jacket that is within five times the radius of the mode-field in the core (the radius of the mode-field being measured at the design wavelength of the optical fiber) have a substantially uniform index of refraction that is at least 0.005 less than that of pure silica, and the index of refraction of the core is at least as great as that of pure silica.

Preferably, that portion of the optical fiber that has said substantially uniform index of refraction has a minimum radius of from 6 to 7 times the radius of the mode-field. At a ratio substantially below 6, the attenuation may become unsatisfactorily high, whereas at a ratio substantially above 7, the preform from which the optical fiber is drawn becomes more difficult and expensive to make.

Preferably, the core of the novel single-mode, polarization-maintaining fiber is silica doped with germanium oxide to provide an index of refraction above that of pure silica, thus making the fiber satisfactorily resistant to adverse bending effects. When that doping provides a refractive index up to 0.005 greater than pure silica, a good balance is achieved between signal attenuation and tolerance to bending. However, an even greater difference in refractive index may be desirable when the optical fiber is to be bent to unusually small radii of curvature.

A preferred polarization-maintaining optical fiber of the invention can be made by depositing siliceous layers onto the interior surface of a hollow substrate tube of silica. Preferably, the first layer to be deposited forms an outer barrier, but the first layer can instead form a stress-applying region. When the first layer is to form an outer barrier, the second layer forms a stress-applying region. Over the layer that is to form the stress-applying region is deposited a siliceous layer that forms an inner barrier and over that a material that forms the core. Two diametrically opposed parallel flat faces are ground into the outer surface of the preform obtained by collapsing the coated substrate tube. The ground preform is drawn to form a single-mode, polarization-maintaining optical fiber of the invention that has an elliptical stress-applying region, with the silica of the substrate tube forming the jacket of the fiber.

Preferably the minor diameter of an elliptical stress-applying region is from 20% to 40% of its major diameter. At greater than 40%, the stress-applying region might not produce the desired degree of stress on the core, whereas at less than 20%, the major diameter of the stress-applying region would necessarily be quite large to permit the inner barrier layer to have adequate thickness.

Instead of grinding flat faces into the preform, the preform may be flattened and drawn while so controlling the temperature to produce an optical fiber, the outer surface of which is elliptical. See Stolen et al.: "High-Birefringence Optical Fibers by Preform Deformation", *Journal of Lightwave Tech.*, Vol. LT-2, No. 5, pp. 639–641 (1984).

DETAILED DISCLOSURE

To be compatible with sensor fibers now on the market, the single-mode, polarization-maintaining optical fiber produced by the above-outlined method can be drawn to a diameter of 80 μm.

For economy of production, the substrate tube can be pure silica. By doping the substrate tube to have an index of refraction equal to that of the cladding, there would be no need for an outer barrier layer, no matter how thin the stress-applying region might be. However, there is no commercially available hollow substrate tube of doped silica, and to provide one might unduly increase the cost of the novel optical fiber.

Even when the substrate tube is pure silica, an outer barrier is unnecessary when the stress-applying region is of such thickness that its minimum diameter extends to at least five times the radius of the mode-field in the core. However, when the substrate tube is pure silica, the presence of an outer barrier layer allows the stress-applying region to have significantly less thickness than would otherwise be necessary. This makes production more economical, because the stress-applying material is easier to control during the collapsing step if it is thinner.

The stress-applying region preferably is doped with $GeO_2$ and $B_2O_3$, and both the inner and outer barriers can be doped with fluorine to make their indices of refraction substantially uniform, typically about 0.007 or 0.008 less than that of pure silica. When the substrate tube is pure silica, the profile of the refractive index of the novel optical fiber shows a uniform depression or well at the cladding. Because of this depression, the core can be undoped silica or only moderately doped to provide an adequate difference in refractive index between the core and the cladding.

When the substrate tube is pure silica, the minimum diameter of that portion of the cladding which has a substantially uniform index of refraction preferably is no more than eight times the diameter of the mode-field in the core, because to achieve a higher multiple would require thicker total deposits that form the stress-applying region and outer barrier. To do so may not only be uneconomical, but could increase the chance of failure during the collapsing step.

THE DRAWING

The invention may be more easily understood in reference to the drawing, all figures of which are schematic. In the drawing.

Figure 1:
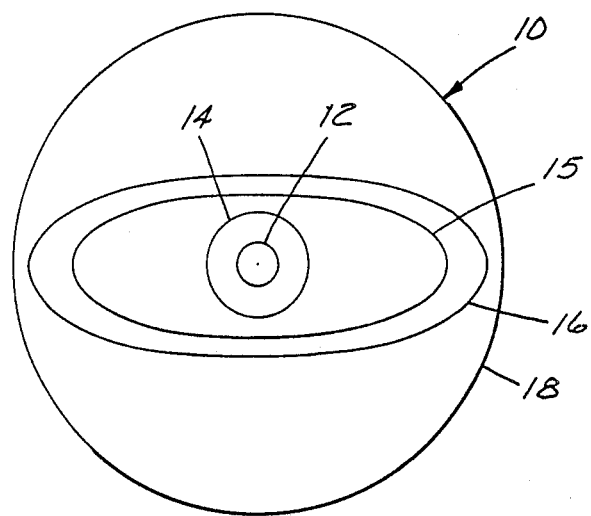
FIG. 1 is a cross section through a preferred optical fiber of the invention.

The optical fiber 10 of FIG. 1 (made as disclosed in Example 1) has a cylindrical waveguide core 12, a cylindrical inner barrier 14, an elliptical stress-applying region 15, an elliptical outer barrier 16, and a jacket 18. Surrounding the jacket 18 are coatings of thermoplastic resin and a sheath (not shown).

Figure 2:
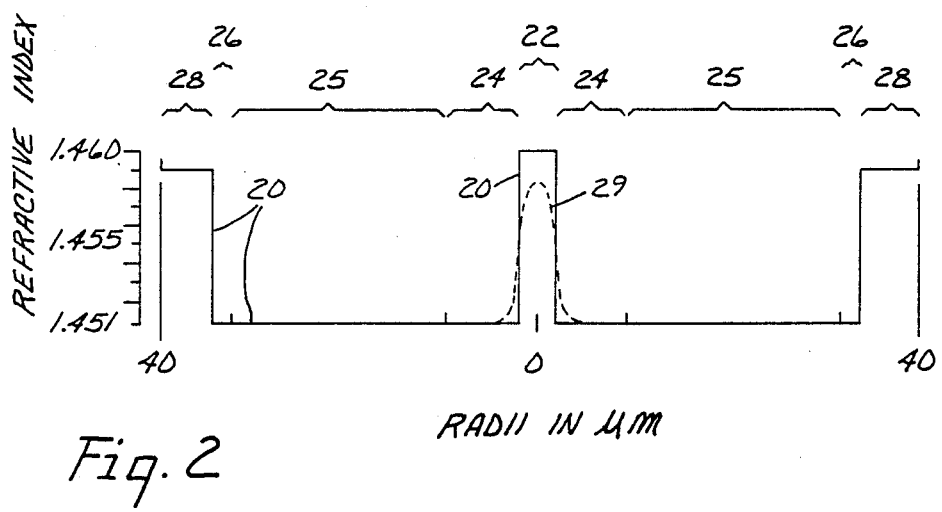
FIGS. 2 and 3 are profiles of refractive indices along the major and minor axes, respectively, of the optical fiber of FIG. 1.
Figure 3:
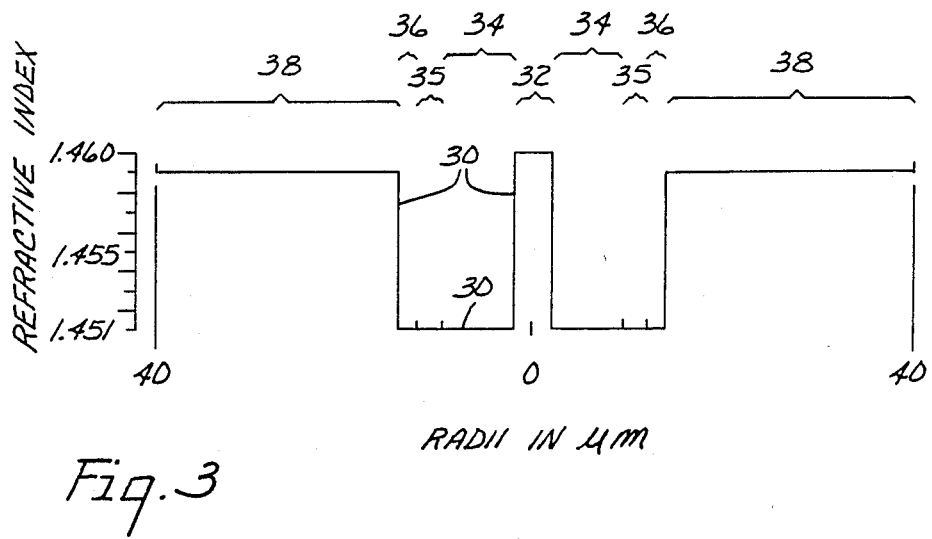

FIGS. 2 and 3 plot the refractive index profiles 20 and 30 along the major and minor axes, respectively, of the optical fiber of FIG. 1, as follows:

| at | at | refractive index of |
|---|---|---|
| 22 | 32 | core 12 |
| 24 | 34 | inner barrier 14 |
| 25 | 35 | stress-applying region 15 |
| 26 | 36 | outer barrier 16 |
| 28 | 38 | jacket 18 |

The normalized curve 29 of FIG. 2 (shown in dotted lines) represents the radial distribution of intensity of light propogated in the core 12. The mode-field diameter in the core is the width of curve 29 at 14% of the peak intensity.

Figure 4:
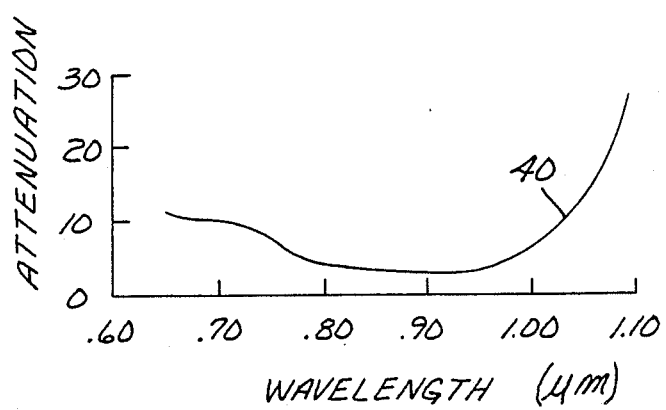
FIG. 4 is a graph of signal attenuation versus wavelength for the optical fiber of FIG. 1.

In FIG. 4, curve 40 indicates signal attenuation (in dB/km) for the polarization-maintaining optical fiber 10 of FIG. 1 at different wavelengths (in $\mu$m).

In the following examples, all parts are by weight.

EXAMPLE 1

(making a polarization-maintaining optical fiber of the invention)

A. Preform Fabrication:

The preform in this example was fabricated by the modified chemical vapor deposition process (MCVD). In this process, glass of controlled composition and thickness is deposited on the inside of a fused silica tube by the chemical reaction of oxygen with metal chlorides or bromides. A more complete description of the process may be found in U.S. Pat. No. 4,217,027 (MacChesney et al)

A fused silica tube (General Electric #982 WGYA) with an inside diameter of nominally 16.0 mm and an outside diameter of nominally 20.0 mm was inserted into a deposition apparatus (preform lathe, gas flow system, hydrogen torch). The inside wall of the tube was first etched with fluorine to produce an uncontaminated surface for deposition. Four layers of glass were then deposited on the inside wall of the tube. The function and compositions of the four layers are described below.

| Function | Composition |
|---|---|
| Layer-1 Outer barrier | $SiO_2/P_2O_5/F$ |
| Layer-2 Stress-applying region | $SiO_2/B_2O_3/GeO_2/P_2O_5$ |
| Layer-3 Inner barrier | $SiO_2/P_2O_5/F$ |
| Layer-4 Core | $SiO_2/GeO_2$ |

Stepwise conditions are listed in Table I. Temperatures reported in Table I are pyrometer readings of the external surface of the fused silica tube. The values for "Speed" indicate the traverse of the torch along the preform.

TABLE I

| Step | \multicolumn{7}{c}{Vapor Flow* ($cm^3$/min)} | No. of Passes | Temp (°C.) | Speed (mm/min) |
|---|---|---|---|---|---|---|---|---|---|---|
| | $SiCl_4$ | $GeCl_4$ | $POCl_3$ | $BBr_3$ | $SiF_4$ | Freon | $O_2$ | | | |
| Etch | | | | | | 20 | 125 | 1 | 1850 | 150 |
| Layer-1 | 300 | | 25 | | 800 | | 1000 | 24 | 1660 | 150 |
| Clear | | | | | | | 1000 | 1 | 1660 | 150 |
| Layer-2 | 300 | 127 | 50 | 750 | | | 2000 | 22 | 1685 | 200 |
| Clear | | | | | | | 2000 | 4 | 1685 | 200 |
| Layer-3 | 300 | | 5 | | 800 | | 1000 | 15 | 1700 | 150 |
| Clear | | | | | | | 1000 | 1 | 1700 | 150 |
| Layer-4 | 30 | 15 | | | | | 1000 | 2 | 1675 | 200 |
| Clear | | | | | | | 1000 | 1 | 1675 | 200 |

*Vapor Flow indicates flow of carrier gas ($O_2$ for the $SiCl_4$, $GeCl_4$ and $POCl_3$, and Ar for the $BBr_3$) or direct flow of $SiF_4$, Freon and $O_2$. Spindle rotation speed is 50 rpm throughout.

After completion of the deposition process, the annular tube with inner deposited layers was collapsed to a non-hollow preform by standard techniques.

B. Preform Shaping:

Two diametrically opposed flat surfaces were ground onto the initially cylindrical preform with a conventional surface grinding machine and a diamond grinding wheel, removing at each flat 2.79 mm radially. Then the preform was thoroughly cleaned to remove any particulate contamination that might result from the grinding procedure.

C. Fiber Draw:

Using a zirconia induction furnace, the preform was drawn to a fiber having a diameter of 80 $\mu$m while maintaining a temperature sufficiently high to give the fiber a circular cross-section. The temperature read by the pyrometer that monitored the furnace was 2170° C. As it was drawn, the fiber was coated with two separate acrylate layers that were individually cured with ultraviolet light. The first acrylate coating applied was 950×075 from DeSoto Co., the second was 3471-2-6, also from DeSoto Co. The coated fiber was spooled onto a reel.

D. Fiber Properties:

The optical fiber resulting from steps A through C has the mechanical and optical properties reported in Table II.

TABLE II

| Mechanical properties | |
|---|---|
| Length | 1600 m |
| Jacket OD | 80 μm |
| Core diameter | 4 μm |
| Inner barrier diameter | 19 μm |
| Elliptical stress applying region | |
| major diameter | 64 μm |
| minor diameter | 24 μm |
| ratio of minor dia. to major dia. | 0.38 |
| Outer barrier | |
| major diameter | 73 μm |
| minor diameter | 28 μm |
| Acrylate coating OD | 215 μm |
| Optical properties | |
| Refractive index of | |
| Length | 1600 m |
| jacket | 1.459 |
| cladding | 1.451 |
| core | 1.460 |
| Attenuation at 0.85 μm | 3.3 dB/km |
| Additional attenuation when the fiber is wrapped 10 turns on a ½" (1.27 cm) mandrel | <0.05 dB |
| Cutoff wavelength | 0.786 μm |
| Mode field diameter at 0.85 μm | 4.4 μm |
| Birefringence at 0.633 μm | $3.9 \times 10^{-4}$ |
| H-parameter at 0.85 μm | |
| 200 m on a spool 12.5" (31.75 cm) OD | $1.1 \times 10^{-5} m^{-1}$ |
| 1000 m on a spool 1.5" (3.8 cm) OD by 3.0" (7.6 cm) in length | $6.7 \times 10^{-5} m^{-1}$ |
| Ratio of minimum radius of jacket to radius of the mode-field | 6.4 |

Because of the presence of phosphorous, the optical fiber of Example 1 may be degraded by exposure to ionizing radiation. The optical fiber of Example 2 should be at least as resistant to adverse effects from ionizing radiation as in any such fiber now on the market.

EXAMPLE 2

A polarization-maintaining optical fiber was made as in Example 1 except as indicated below.

A and B. Preform Fabrication and Shaping

| Function | Composition |
|---|---|
| Layer-1 Outer barrier | $SiO_2/F$ |
| Layer-2 Stress-applying region | $SiO_2/B_2O_3/GeO_2$ |
| Layer-3 Inner barrier | $SiO_2/F$ |
| Layer-4 Core | $SiO_2/GeO_2$ | and stepwise conditions were as listed in Table III.

C. Fiber Draw

The preform was drawn as in Example 1, with the exception that the pyrometer monitoring the furnace read 2152° C.

D. Fiber properties

The mechanical and optical properties of the optical fiber of Example 2 are reported in Table IV.

TABLE III

| Step | SiCl₄ | GeCl₄ | Vapor Flow* (cm³/min) BBr₃ | SiF₄ | Freon | He | O₂ | No. of Passes | Temp (°C.) | Speed (mm/min) |
|---|---|---|---|---|---|---|---|---|---|---|
| Etch | | | | | 20 | | 125 | 1 | 1850 | 150 |
| Layer-1 | 950 | | | 800 | | 1000 | 400 | 12 | 1660 | 150 |
| Clear | | | | | | 1000 | 400 | 1 | 1660 | 150 |
| Layer-2 | 300 | 220 | 750 | | | | 2000 | 22 | 1685 | 200 |
| Clear | | | | | | | 2000 | 4 | 1685 | 200 |
| Layer-3 | 950 | | | 800 | | 1000 | 400 | 5 | 1700 | 150 |
| Clear | | | | | | 1000 | 400 | 1 | 1700 | 150 |
| Layer-4 | 30 | 13 | | | | | 1000 | 2 | 1725 | 200 |
| Clear | | | | | | | 1000 | 1 | 1725 | 200 |

*Vapor Flow indicates flow of carrier gas (O₂ and He for the SiCl₄ and GeCl₄, and Ar for the BBr₃) or direct flow of SiF₄, Freon and O₂. Spindle rotation speed is 50 rpm throughout.

TABLE IV

| Mechanical properties | |
|---|---|
| Length | 1600 m |
| Jacket OD | 80 μm |
| Core diameter | 4 μm |
| Inner barrier diameter | 21 μm |
| Elliptical stress applying region | |
| major diameter | 67 μm |
| minor diameter | 24 μm |
| ratio of minor dia. to major dia. | 0.36 |
| Outer barrier | |
| major diameter | 80 μm |
| minor diameter | 34 μm |
| Acrylate coating OD | 220 μm |
| Optical properties | |
| Refractive index of | |
| jacket | 1.459 |
| cladding | 1.454 |
| core | 1.461 |
| Attenuation at 0.85 μm | 2.8 dB/km |
| Additional attenuation when the fiber is wrapped 10 turns on a ½" (1.27 cm) mandrel | <0.05 dB |
| Cutoff wavelength | 0.76 μm |
| Mode field diameter at 0.85 μm | 4.6 μm |
| Birefringence at 0.633 μm | $3.9 \times 10^{-4}$ |
| H-parameter at 0.85 μm | |
| 250 m on a spool 12.5" (31.75 cm) OD | $1.9 \times 10^{-6} m^{-1}$ |
| Ratio of minimum radius of jacket to radius of the mode-field | 7.4 |

EXAMPLE 3

A and B. Preform Fabrication and Shaping

A preform for a polarization-maintaining optical fiber was made as in Example 1, parts A and B. The composition of the layers is nominally the same as in Example 1. Stepwise conditions are listed in Table V.

C. Fiber Draw

The preform was drawn as in Example 1, with the exceptions that the fiber was drawn to a diameter of 125 μm to increase the cutoff wavelength to 1.12 μm and thus enable operation at 1.3 μm, and the pyrometer monitoring the furnace read 2152° C.

D. Fiber Properties

The mechanical and optical properties of the optical fiber of Example 3 are reported in Table VI.

TABLE V

| Step | SiCl$_4$ | GeCl$_4$ | POCl$_3$ | BBr$_3$ | SiF$_4$ | Freon | He | O$_2$ | No. of Passes | Temp (°C.) | Speed (mm/min) |
|---|---|---|---|---|---|---|---|---|---|---|---|
| Etch | | | | | | 20 | | 125 | 1 | 1850 | 150 |
| Layer-1 | 950 | | 25 | | 800 | | 1000 | 400 | 10 | 1660 | 150 |
| Clear | | | | | | | 1000 | 400 | 1 | 1660 | 150 |
| Layer-2 | 300 | 160 | 50 | 750 | | | | 2000 | 22 | 1685 | 200 |
| Clear | | | | | | | | 2000 | 4 | 1685 | 200 |
| Layer-3 | 950 | | 5 | | 800 | | 1000 | 400 | 5 | 1700 | 150 |
| Clear | | | | | | | 1000 | 400 | 1 | 1700 | 150 |
| Layer-4 | 30 | 14 | | | | | | 1000 | 2 | 1700 | 200 |
| Clear | | | | | | | | 1000 | 1 | 1700 | 200 |

*Vapor Flow indicates flow of carrier gas (O$_2$ and He for the SiCl$_4$, GeCl$_4$ and POCl$_3$, and Ar for the BBr$_3$) or direct flow of SiF$_4$, Freon, He and O$_2$. Spindle rotation speed is 50 rpm throughout.

TABLE VI

| Mechanical properties | |
|---|---|
| Drawn length | 500 m |
| Jacket OD | 125 μm |
| Core diameter | 6.4 μm |
| Inner barrier diameter | 33 μm |
| Elliptical stress applying region | |
| major diameter | 101 μm |
| minor diameter | 40 μm |
| ratio of minor dia. to major dia. | 0.40 |
| Outer barrier | |
| major diameter | 121 μm |
| minor diameter | 52 μm |
| Acrylate coating OD | 235 μm |
| Optical properties | |
| Refractive index of | |
| jacket | 1.459 |
| cladding | 1.454 |
| core | 1.461 |
| Attenuation at 1.3 μm | 0.72 dB/km |
| Additional attenuation when the fiber is wrapped 10 turns on a ½" (1.27 cm) mandrel | <0.05 dB |
| Cutoff wavelength | 1.12 μm |
| Mode field diameter at 1.3 μm | 7.1 μm |
| Birefringence at 0.633 μm | $3.9 \times 10^{-4}$ |
| H-parameter at 1.3 μm 500 m on a spool 12.5" (31.75 cm) OD | $6.6 \times 10^{-7} \mathrm{m}^{-1}$ |
| Ratio of minimum radius of jacket to radius of the mode-field | 7.3 |

We claim:

1. A single-mode, polarization-maintaining optical fiber comprising a core, a cladding which includes asymmetric stress-applying region or regions and an inner barrier between the core and the stress-applying region or regions, and a jacket surrounding the cladding, characterized by the feature that:
   the cladding and any portion of the jacket that is within five times the radius of the mode-field in the core have a substantially uniform index of refraction that is at least 0.005 less than that of pure silica, and the index of refraction of the core is at least as great as that of pure silica.

2. A single-mode optical fiber as defined in claim 1 wherein said stress-applying region or regions is a substantially elliptical region.

3. A single-mode optical fiber as defined in claim 2 wherein the cladding includes an outer barrier between the stress-applying region and the jacket.

4. A single-mode optical fiber as defined in claim 3, the core of which is silica containing dopant to have a refractive index up to 0.005 more than that of pure silica.

5. A single-mode optical fiber as defined in claim 4 wherein said dopant is GeO$_2$.

6. A single-mode optical fiber as defined in claim 3 wherein both the inner and outer barriers are doped with fluorine.

7. A single-mode optical fiber as defined in claim 3 wherein there is no more than 0.013 difference in index of refraction between the core and that portion of the cladding which has said substantially uniform index of refraction.

8. A single-mode optical fiber as defined in claim 3 wherein the minimum diameter of that portion of the cladding which has said substantially uniform index of refraction is no more than eight times the diameter of the mode-field in the core.

9. A single-mode optical fiber as defined in claim 2 wherein said elliptical stress-applying region is doped with GeO$_2$ and B$_2$O$_3$.

10. A single-mode optical fiber as defined in claim 2 wherein the minor diameter of the stress-applying region is from 20% to 40% of its major diameter.

11. A single-mode optical fiber as defined in claim 1, the jacket of which is substantially pure silica.

12. Method of making a single-mode, polarization-maintaining optical fiber by the steps of
   (a) depositing at least two layers of siliceous material onto the interior surface of a hollow silica substrate tube,
   (b) depositing a layer of siliceous material over layers deposited in step (a),
   (c) collapsing the coated tube to provide a preform,
   (d) forming two diametrically opposed parallel flat faces into the outer surface of the preform, and
   (e) drawing the preform to form a single-mode, polarization-maintaining optical fiber wherein one of the layers deposited in step (a) forms an asymmetric stress-applying region, a layer subsequently deposited in step (a) forms an inner barrier, the layer deposited in step (b) forms the core of the optical fiber, and the layers deposited in step (a) and any portion of the jacket that is within five times the radius of the mode-field in the core have a substantially uniform index of refraction that is at least 0.005 less than that of pure silica.

13. Method of making an optical fiber as defined in claim 12 wherein the substrate tube employed in step (a) is substantially pure silica.

14. Method of making an optical fiber as defined in claim 12 wherein the siliceous material deposited in step (b) is doped to afford an index of refraction up to 0.005 more than that of pure silica.

15. Method of making an optical fiber as defined in claim 12 wherein the first layer deposited in step (a) forms an outer barrier, the second layer deposited in step (a) forms said asymmetric stress-applying region, and a third layer is deposited in step (a) to form said inner barrier.

16. Method of making an optical fiber as defined in claim 15 wherein said second layer is doped with $GeO_2$ and $B_2O_3$.

17. A single-mode optical fiber as defined in claim 15 wherein each of said first and third layers is doped with fluorine.

* * * * *

UNITED STATES PATENT AND TRADEMARK OFFICE
CERTIFICATE OF CORRECTION

PATENT NO. : 4,896,942

DATED : January 30, 1990

INVENTOR(S) : James R. Onstott, Michael J. Messerly, Raymond C. Mikkelson, and Lawrence J. Donalds It is certified that error appears in the above-indentified patent and that said Letters Patent is hereby corrected as shown below:

Column 5, line 68, insert -- . -- between "al" and ")"

Column 7, line 33, delete "Length    1600 m"

Signed and Sealed this

Thirteenth Day of June, 1995

*Attest:*

BRUCE LEHMAN

*Attesting Officer*     *Commissioner of Patents and Trademarks*